(12) United States Patent
Wu et al.

(10) Patent No.: US 10,209,607 B2
(45) Date of Patent: Feb. 19, 2019

(54) PROJECTOR WITH A MIRROR MOUNTED ON THE BODY FOR CHANGING PROJECTION DIRECTION

(71) Applicant: APPOTRONICS CORPORATION LIMITED, Shenzhen (CN)

(72) Inventors: Xiliang Wu, Shenzhen (CN); Yongzhuang Chen, Shenzhen (CN); Yi Deng, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/569,327

(22) PCT Filed: Apr. 29, 2016

(86) PCT No.: PCT/CN2016/080648
§ 371 (c)(1),
(2) Date: Oct. 25, 2017

(87) PCT Pub. No.: WO2016/173529
PCT Pub. Date: Nov. 3, 2016

(65) Prior Publication Data
US 2018/0120677 A1    May 3, 2018

(30) Foreign Application Priority Data

Apr. 29, 2015   (CN) .................... 2015 2 0270036 U

(51) Int. Cl.
*G03B 21/14*   (2006.01)
*G02B 7/182*   (2006.01)
(Continued)

(52) U.S. Cl.
CPC ......... *G03B 21/142* (2013.01); *G02B 7/1821* (2013.01); *G03B 21/145* (2013.01); *G03B 21/28* (2013.01); *G03B 21/30* (2013.01)

(58) Field of Classification Search
CPC .... G03B 21/142; G03B 21/145; G03B 21/28; G02B 7/1821
See application file for complete search history.

(56) References Cited

U.S. PATENT DOCUMENTS 5,622,417 A  *  4/1997  Conner ................ G03B 21/132
                                                            348/E5.141
8,425,049 B2      4/2013  Hirata et al.
(Continued)

FOREIGN PATENT DOCUMENTS

CN          101295124 A       10/2008
CN          101776839 A        7/2010
(Continued)

OTHER PUBLICATIONS

International Search Report in the parent PCT application No. PCT/CN2016/080648, dated Jun. 29, 2016.
(Continued)

*Primary Examiner* — Sultan Chowdhury
*Assistant Examiner* — Magda Cruz
(74) *Attorney, Agent, or Firm* — Chen Yoshimura LLP

(57) ABSTRACT

Disclosed is a projector (1), comprising a projector body (10) with a lens (12), and a light reflection assembly (20) for adjusting a projecting direction of the lens (12). The light reflection assembly (20) comprises a reflective mirror (23), and the light reflection assembly (20) is provided to be rotatably connected with the projector body (10). During the rotation, a mirror face of the reflective mirror (23) always faces towards the lens (12), so that the reflective mirror (23) adjusts the angle of the projecting direction between the mirror face and the lens (12) with the rotation of the light reflection assembly (20), so as to adjust the projecting location of the lens (12) by means of the rotation of the
(Continued)

reflective mirror (23), such that the projecting direction can be changed without moving the projector (1).

6 Claims, 6 Drawing Sheets

(51) Int. Cl.
*G03B 21/28* (2006.01)
*G03B 21/30* (2006.01)

(56) References Cited

U.S. PATENT DOCUMENTS

| | | |
|---|---|---|
| 8,465,157 B2 | 6/2013 | Ichikawa et al. |
| 8,690,349 B2 | 4/2014 | Hirata et al. |
| 9,134,598 B2 | 9/2015 | Zheng et al. |
| 9,429,832 B2 | 8/2016 | Hirata et al. |
| 2002/0122161 A1* | 9/2002 | Nishida ............... G03B 21/14 353/70 |
| 2008/0266531 A1 | 10/2008 | Wu et al. |
| 2010/0171937 A1 | 7/2010 | Hirata et al. |
| 2010/0321643 A1 | 12/2010 | Ichikawa et al. |
| 2011/0075115 A1* | 3/2011 | Ono ..................... G03B 21/28 353/98 |
| 2013/0229633 A1 | 9/2013 | Hirata et al. |
| 2014/0132936 A1 | 5/2014 | Zheng et al. |
| 2014/0146294 A1 | 5/2014 | Hirata et al. |

FOREIGN PATENT DOCUMENTS

| | | |
|---|---|---|
| CN | 101930157 A | 12/2010 |
| CN | 103809354 A | 5/2014 |
| CN | 204631432 U | 9/2015 |
| JP | H 10260473 A | 9/1998 |
| JP | 2006047595 A | 2/2006 |
| JP | 2007310194 A | 11/2007 |
| JP | 2012037674 A | 2/2012 |
| KR | 20120013768 A | 2/2012 |

OTHER PUBLICATIONS

IPRP in the parent PCT application No. PCT/CN2016/080648, dated Oct. 31, 2017.

* cited by examiner

PROJECTOR WITH A MIRROR MOUNTED ON THE BODY FOR CHANGING PROJECTION DIRECTION

BACKGROUND OF THE INVENTION

Field of the Invention

This invention relates to projection technology, and in particular, it relates to a projector.

Description of Related Art

Projectors are becoming widely used. Conventional projectors adopt horizontal projection, i.e. the image is projected along the projection direction of the projection lens. Thus, it is very difficult to change the projection direction without moving the entire projector. This is inconvenient for the user.

SUMMARY

Accordingly, embodiments of the present invention provide a projector that can change the direction of projection.

To achieve the above objects, the present invention provides a projector, which includes: a projector body having a lens; and a light reflection assembly for adjusting a projection direction of the lens; wherein the light reflection assembly includes a reflective mirror, wherein the reflective mirror is rotatably connected to the projector body, and wherein during rotation, a mirror surface of the reflective mirror always faces towards the lens.

Preferably, the light reflecting assembly further includes a first support frame, the first support frame being pivotally connected to the projector body at a location corresponding to the lens, wherein the reflective mirror is fixedly connected to the first support frame.

Preferably, the first support frame includes a first mounting plate, the first mounting plate being pivotally connected to the projector body; and wherein the first mounting plate has a first mounting slot for mounting the reflective mirror, and wherein the reflective mirror is accommodated in the first mounting slot.

Preferably, the projector further includes a first lens cover for protecting the lens, wherein the first lens cover and the first mounting plate are formed integrally.

Preferably, the projector further includes a second lens cover for protecting the lens, the second lens cover being connected to the projector body,
wherein the second lens cover includes a through hole for the projected image light from the lens to pass through;
wherein the light reflecting assembly further includes a second support frame, the second support frame having a shape and size adapted to the thorough hole, the second support frame being pivotally connected to the second lens cover, wherein the second support frame has a closed state where it blocks the through hole, and an open state where it is separated from the through hole, and wherein the reflective mirror is fixedly connected to the second support frame.

Preferably, the second support frame includes a second mounting plate, wherein the second mounting plate is pivotally connected to the second lens cover; and wherein the second mounting plate has a second mounting slot for mounting the reflective mirror, and wherein the reflective mirror is accommodated in the second mounting slot.

Preferably, the second lens cover is rotatably connected to the projector body, wherein when the second lens cover is rotated to a predetermined position relative to the projector body, the second lens cover supports the projector body.

Preferably, the light reflecting assembly further includes a base and a third support frame pivotally connected to the base, wherein the reflective mirror is fixedly connected to the third support frame, and wherein the base is detachably attached to the projector body.

Preferably, the third support frame includes a third mounting plate, wherein the third mounting plate is pivotally connected to the base; and
wherein the third mounting plate has a third mounting slot for mounting the reflective mirror, and wherein the reflective mirror is accommodated in the third mounting slot.

Preferably, a housing of the projector body is magnetic, wherein the light reflecting assembly further includes a magnetic member having a magnetic property corresponding to that of the housing, and wherein the magnetic member and the housing cooperate to connect the base to the projector body.

In embodiments of the invention, by rotatably connecting the light reflecting assembly to the projector body, and by making the mirror surface of the reflecting mirror always face the projection lens during rotation, via the rotation of the light reflecting assembly, the reflecting mirror can adjust the angle between the reflecting surface and the projection direction of the lens, so as to achieve the adjustment of the image position of the projection lens using the rotation of the reflective mirror. Thus, the image position of the projection lens can be adjusted without moving the entire projector, which enhances user experience.

Figure 1:
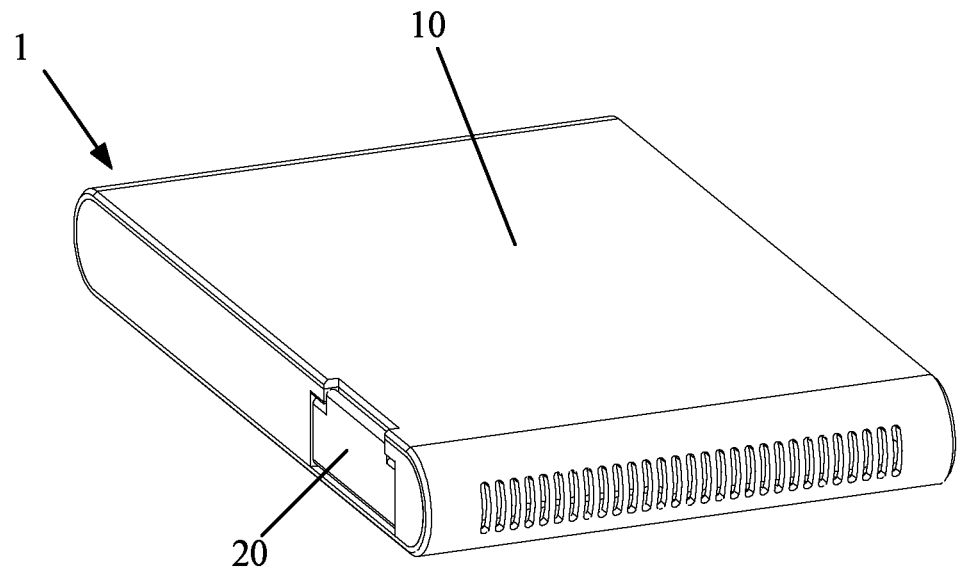
FIG. 1 illustrates a projector according to a first embodiment of the present invention.
Figure 2:
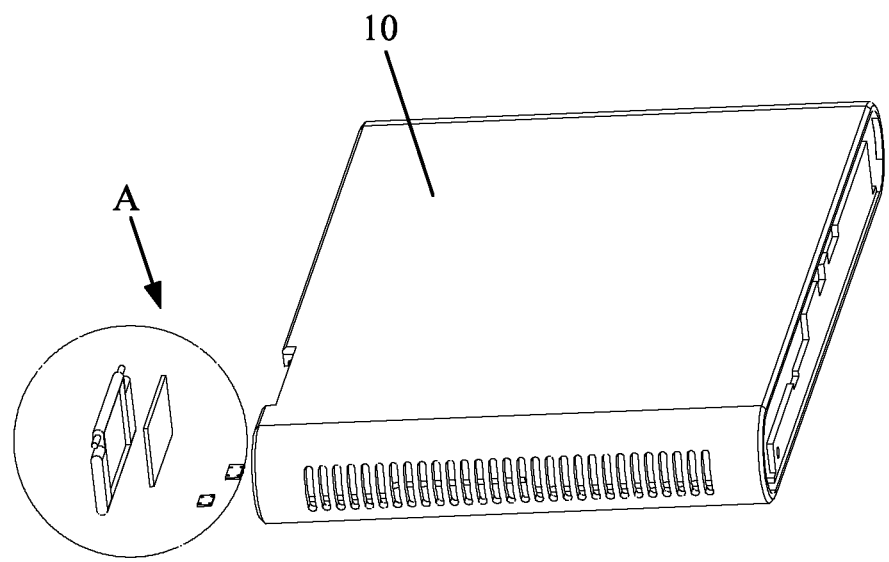
FIG. 2 is a partial exploded view of a portion the projector according to the first embodiment.
Figure 3:
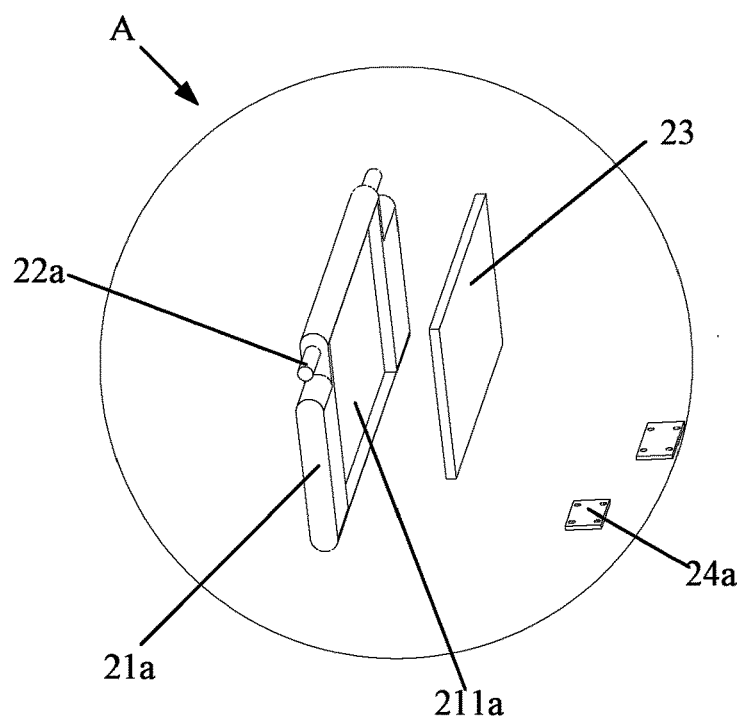
FIG. 3 is an enlarged view showing the structure of the portion A of FIG. 2.
Figure 4:
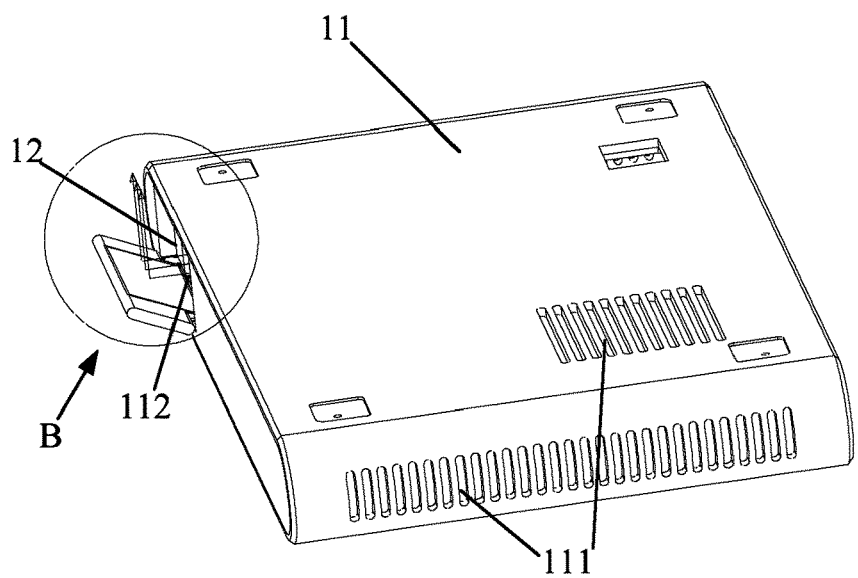
FIG. 4 illustrates the structure of the light reflection assembly of the projector according to the first embodiment during operation.
Figure 5:
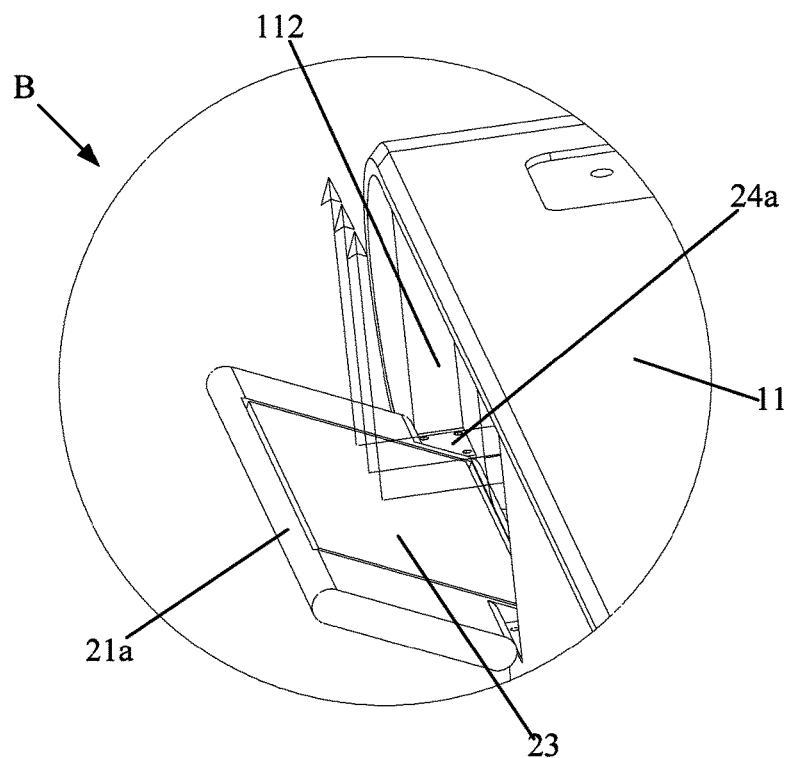
FIG. 5 is an enlarged view showing the structure of the portion B of FIG. 4.

Embodiments of the present invention and the objectives, features and advantages of the invention are described in detail below with reference to the drawings.

DETAILED DESCRIPTION OF PREFERRED EMBODIMENTS

The embodiments described below are for purposes of explaining the invention and do not limit the scope of the invention.

Various embodiments of the present invention provide a projector.

In one embodiment, sown in FIGS. 1-5, the projector 1 includes a projector body 10 having a lens 12, and a light reflecting assembly 20 for adjusting a projection direction of the lens 12. The light reflecting assembly 20 includes a reflective mirror 23, which is rotatably connected to the projector body 10, and the mirror surface of the reflective mirror 23 always faces towards the lens 12 during the rotation.

More specifically, in this embodiment, the projector 1 includes the projector body 10 and the light reflecting assembly 20. The projector body 10 includes a housing 11 and the lens 12. The housing 11 has a substantially rectangular cuboid shape with a low profile. On one side of the housing 11, a mounting opening 112 is provided to accommodating the lens 12. The shape of the opening 112 may be designed based on the shape of the lens 12 and other practical considerations. The lens 12 is disposed inside the opening 112. The light reflecting assembly 20 may be rotatably connected to the projector body 10 in a variety of ways, such as by articulated connection, hinges, etc. The rotatable connection of the light reflecting assembly 20 to the projector body 10 will be described in more detail later. The reflective mirror 23 functions to reflect the projected light beam from the lens 12 to the user's desired position, e.g., to the ceiling. To achieve the above function, when the reflective surface of the reflective mirror 23 rotates with the light reflecting assembly 20, the reflective surface always faces the lens 12 and reflects the image light from the lens 12. In other words, the lens 12 projects the image light to the reflective mirror 23, and the reflective mirror 23 reflects the image light to the desired position.

On bottom surface, top surface, and/or side surfaces of the housing 11, heat dissipation orifices 111 are provided. The orifices 111 may have any suitable form, such as a grille, etc. Also disposed on the bottom surface are anti-slip mats (not shown).

In this embodiment, by rotatably connecting the light reflecting assembly 20 to the projector body 10 and by making the reflective surface of the mirror 23 always face the lens 12 during rotation, the reflective mirror 23 rotates with the light reflecting assembly 20 to adjust the angle of the projected image formed by the lens 12. Thus, by rotating the reflective mirror 23 to adjust the position of the projected image of the lens 12, the position of the projected image of the lens 12 can be adjusted without moving the entire projector 1. This enhances the user experience.

Further, based on the above embodiment, the light reflecting assembly 20 includes a first support frame, which is pivotally connected to the projector body 10 at a position corresponding to the lens 12. The reflective mirror 23 is fixedly connected to the first support frame. The first support frame includes a first mounting plate 21a, which is pivotally connected to the projector body 10. The first mounting plate 21a has a first mounting slot 211a for mounting the reflective mirror 23, and the reflective mirror 23 is accommodated in the first mounting slot 211a.

More specifically, referring to FIGS. 1-5, in this embodiment, the first support frame includes the first mounting plate 21a for mounting the reflective mirror 23, a first rotating shaft 22a for connecting the first mounting plate 21a to the projector body 10, and pressing plates 24a for securing the first rotating shaft 22a. The first mounting plate 21a has a through hole (not shown) at one end for the first rotating shaft 22a to pass through. In other implementations, the first rotating shaft 22a may be formed integrally with the first mounting plate 21a. The shape and size of the first mounting plate 21a are adapted to the shape and size of the mounting opening 112. In some examples, the opening 112 has a substantially rectangular cross section, and the cross sectional size of the opening 112 is slightly larger than the size of the first mounting plate 21a, so that the first mounting plate 21a may be disposed inside the opening 112 and can block the opening 112. The shape and size of the reflective mirror 23 are adapted to the shape and size of the first mounting plate 21a, and the size of the reflective mirror 23 is slightly smaller than the size of the first mounting plate 21a. On the periphery of the opening 112, grooves (not shown) are formed on the projector body 10 to accommodate the first rotating shaft 22a. The sections of the first rotating shaft 22a that protrude from the first mounting plate 21a are accommodated in the groves. The pressing plates 24a are affixed to the projector body 10 and cover the opening of the grooves, to allow the first rotating shaft 22a to rotate inside the groove.

In this embodiment, by pivotally connecting the first support frame to the projector body 10, the rotatable connection of the first support frame is stable and reliable. By mounting the reflective mirror 23 on the first mounting plate 21a, the mounting of the reflective mirror 23 is stable and reliable. By using the grooves and the pressing plates 24a, the mounting of the first mounting plate 21a is stable and reliable, and at the same time, the disassembling and assembling of the first mounting plate 21a is convenient, which facilitates the maintenance and replacement of the first mounting plate 21a.

In another embodiment, the projector body 10 includes a first lens cover for protecting the lens 12. When the lens 12 is not in use, the first lens cover cooperates with the opening 112, to block the opening 112, so that dust and moisture from the outside does not easily enter the space of the lens 12. The first lens cover and the first mounting plate 21a are integrated into one, i.e., the first mounting plate 21a functions as the first lens cover. In this embodiment, by making the shape and size of the first mounting plate 21a slightly smaller than the mounting opening 112, the first mounting plate 21a can achieve the function of the first lens cover. Thus, a separate lens cover for the lens 12 is not needed, which can lower the manufacturing cost of the projector 1.

In another embodiment, the projector 1 includes a second lens cover 13 for protecting the lens 12. The second lens cover 13 is connected to the projector body 10. The light reflecting assembly 20 includes a second support frame, and the reflective mirror 23 is fixedly connected to the second support frame. The second support frame is pivotally connected to the second lens cover 13. The second support frame includes a second mounting plate 21b, which is pivotally connected to the second lens cover 13. The second mounting plate 21b has a second mounting slot for mounting the reflective mirror 23, and the reflective mirror 23 is accommodated in the second mounting slot.

Figure 6:
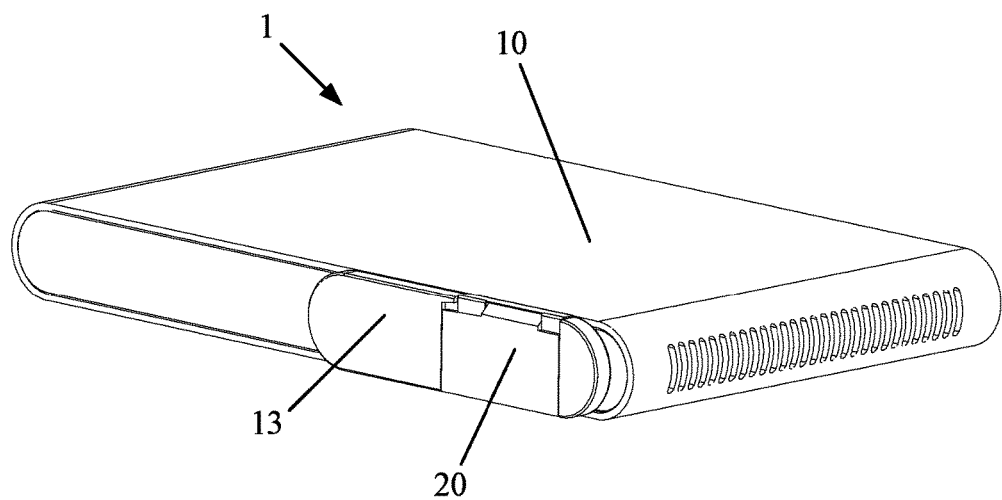
FIG. 6 illustrates a projector according to a second embodiment of the present invention.
Figure 7:
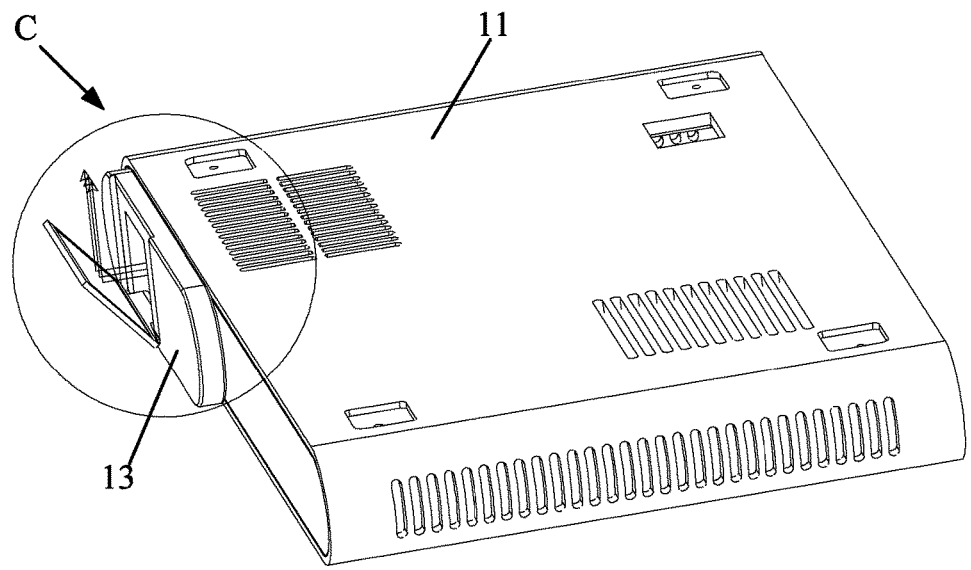
FIG. 7 illustrates the structure of the light reflection assembly of the projector according to the second embodiment during operation.
Figure 8:
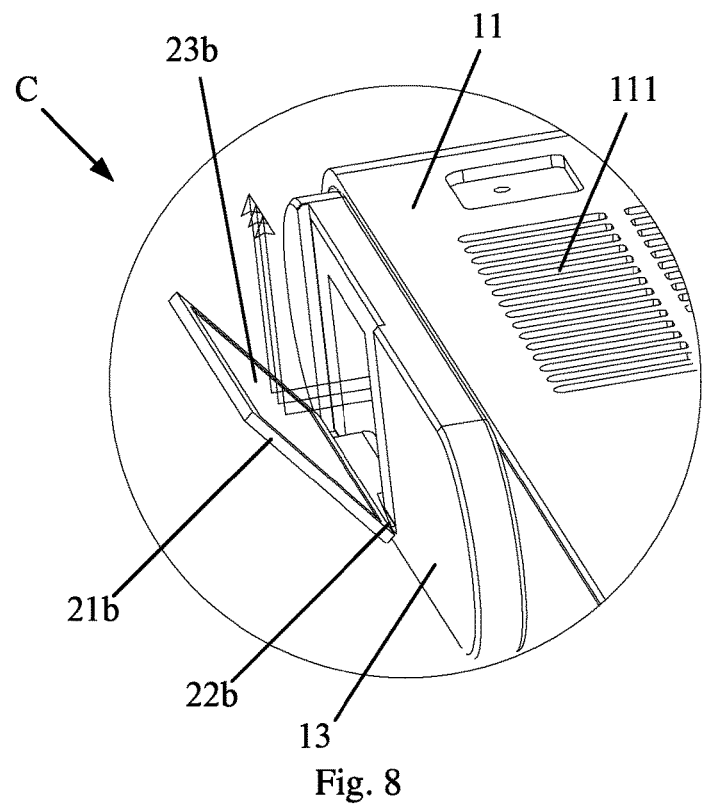
FIG. 8 is an enlarged view showing the structure of the portion C of FIG. 7.

More specifically, referring to FIGS. 6-8, in this embodiment, the second lens cover 13 has a racetrack shape (i.e. a rectangle with two round ends) along its length direction, and is disposed on the side of the projector body 10 that has the lens opening. The size of the second lens cover 13 is larger than the size of the mounting opening 112. The second lens cover 13 has a through hole at one end, which is aligned with the mounting opening 112. The second support frame is pivotally connected to the second lens cover 13 at a location near the through hole. The shape and size of the second mounting plate 21b are adapted to the shape and size of the through hole. More specifically, the size of the second mounting plate 21b is slightly smaller than the size of the through hole, and the second mounting plate 21b blocks the through hole to prevent dust and moisture from entering the space of the lens 12 when the projector 1 is not being used. The second mounting plate 21b is pivotally connected to the second lens cover 13 near the through hole via the second rotating shaft 22b. In this embodiment, when the projector 1 is in operation, the image projected by the lens 12 is projected through the through hole.

The second lens cover 13 is rotatably connected to the projector body 10. When the second lens cover 13 is rotated to a predetermined position relative to the projector body 10, the second lens cover 13 props up the projector body 10. More specifically, the second lens cover 13 is rotatably connected to the projector body 10 such that the second lens cover 13 can rotate relative to the projector body 10, and when the second lens cover 13 is rotated to a predetermined position relative to the projector body 10, the second lens cover can function as a support for the projector 1. The rotatable connection can be implemented in any suitable ways. For example: The second lens cover 13 and the projector body 10 are both provided with a shaft hole, and are rotatably connected to each other via a rotating shaft. In another example, the projector body 10 is provided with a rotating shaft, and the second lens cover 13 is provided with a track on the side facing the projector body 10; when the second lens cover 13 moves along the track, the second lens cover 13 rotates.

In this embodiment, by providing a through hole on the second lens cover 13, and by pivotally connecting the second support frame on the second lens cover 13 near the through hole, the reflective mirror 23 can reflect the image projected by the lens 12. By controlling the angle between the reflective mirror 23 and the projection direction of the lens 12, the position of the projected image can be adjusted, which can meet the user's need and enhance the user's experience. Meanwhile, by rotatably connecting the second lens cover 13 to the projector body 10, when the second lens cover 13 is rotated to a predetermined position, it can function as a support for the projector 1. This can eliminate the need for a separate support foot, which reduces the manufacturing cost.

In a further embodiment, the light reflecting assembly 20 includes a base 22c and a third support frame pivotally connected to the third support frame. The reflective mirror 23 is fixedly connected to the third support frame. The base 22c is detachably connected with the projector body 10. The third support frame includes a third mounting plate 21c, which is pivotally connected to the base 22c. The third mounting plate 21c has a third mounting slot for mounting the reflective mirror 23, and the reflective mirror 23 is accommodated in the first mounting slot.

Figure 9:
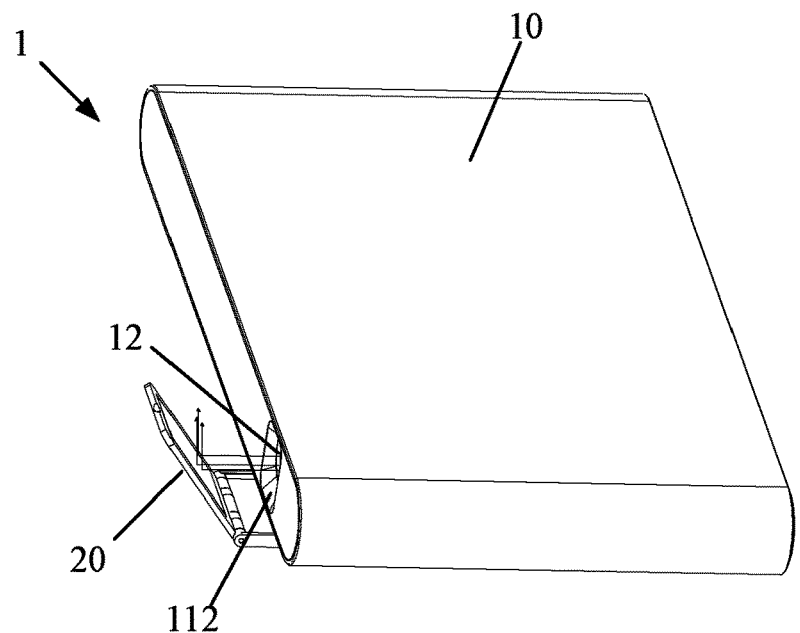
FIG. 9 illustrates the structure of the light reflection assembly of a projector according to a third embodiment of the present invention during operation.
Figure 10:
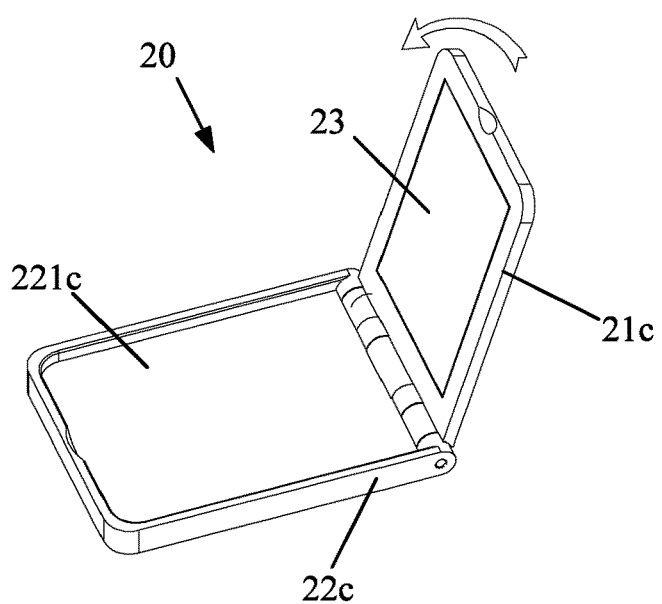
FIG. 10 illustrates the structure of the light reflection assembly of a projector according to the third embodiment.
Figure 11:
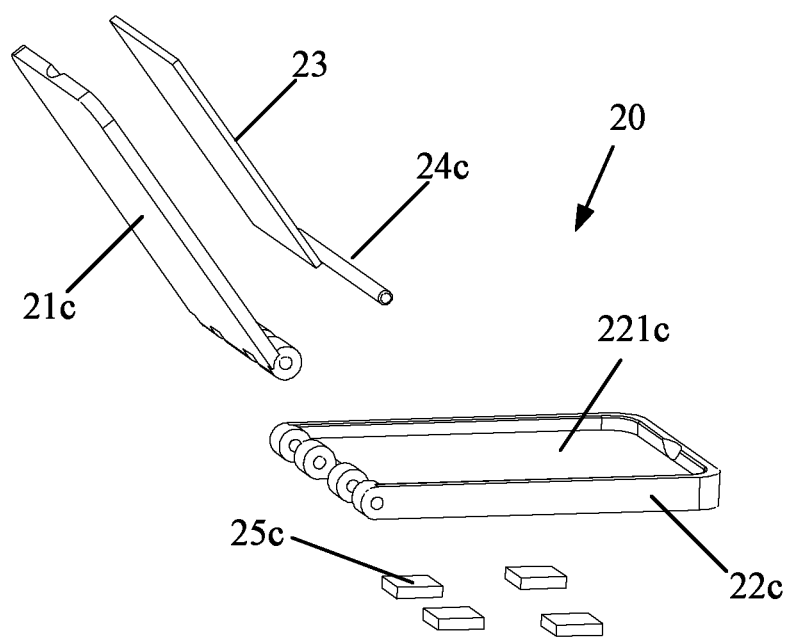
FIG. 11 is an exploded view of the light reflection assembly of the third embodiment.

More specifically, referring to FIGS. 9-11, in this embodiment, the base 22c has a storage slot 221c which has a shape and a size that are adapted to the third support frame. When the light reflecting assembly 20 is in use, the third support frame can be stored in the storage slot. In one example, the third support frame is preferably a third mounting plate 21c, which has a rectangular shape. The size of the third mounting plate 21c is slightly smaller than the size of the storage slot 221c. The base 22c also has a rectangular shape. One end of the third mounting plate 21c is pivotally connected to one end of the base 22c by a third rotating shaft 24c. The third mounting plate 21c can rotate or swing around the third rotating shaft 24c, so the reflective mirror 23 fixedly mounted on the third mounting plate 21c rotates with the third mounting plate 21c. When the base 22c is mounted on the housing 11 of the projector body 10, the side of the third mounting plate 21c that has the reflective mirror faces the mounting opening 112, so that the reflective mirror faces the lens 12.

The connection between the base 22c and the projector body 10 is preferably detachable. Detachable connection can be realized in many ways, such as threaded connection, snap connection, etc. In one embodiment, a magnetic member 25c is used to affix the light reflecting assembly 20 by magnetic force. More specifically, the housing 11 of the projector body 10 is a magnetic material, and the light reflecting assembly 20 includes the magnetic member 25c having a corresponding magnetic property. The magnetic member 25c cooperates with the housing 11 to mount the base 22c. The housing 11 may be an iron or steel material, or a magnetic member having N and S poles (such as a magnet). The magnetic member 25c is a magnet. The magnetic properties of the housing 11 and the magnetic member 25c are different so that they are attracted to each other.

In this embodiment, by using the third support frame and the base 22c, the reflective mirror 23 can reflect the projected image formed by the lens 12. By controlling the angle between the reflective mirror 23 and the projection direction of the lens 12, the projection position of the image may be adjusted so as to meet the need of the user, which enhances user experience. By using a magnetic member 25c to connect the light reflecting assembly 20 and the projector body 10, the light reflecting assembly 20 is stably and reliably connected to, and at the same time can be conveniently detached from the projector body 10. This facilitates the maintenance of the light reflecting assembly 20. It should also be noted that by the cooperation of the third mounting plate 21c and the base 22c, the light reflecting assembly 20 can be conveniently folded and stowed when it is not in use.

It will be apparent to those skilled in the art that various modification and variations can be made in the projector of the present invention without departing from the spirit or scope of the invention. Thus, it is intended that the present invention cover modifications and variations that come within the scope of the appended claims and their equivalents.

What is claimed is:

1. A projector comprising:
   a projector body having a lens;
   a light reflection assembly for adjusting a projection direction of the lens;
   wherein the light reflection assembly includes a reflective mirror, wherein the reflective mirror is rotatably connected to the projector body, and wherein during rotation, a mirror surface of the reflective mirror always faces towards the lens; and
   a second lens cover for protecting the lens, the second lens cover being connected to the projector body,
   wherein the second lens cover includes a through hole for the projected image light from the lens to pass through; and
   wherein the light reflecting assembly further includes a second support frame, the second support frame having a shape and size adapted to the thorough hole, the second support frame being pivotally connected to the second lens cover, wherein the second support frame has a closed state where it blocks the through hole, and an open state where it is separated from the through hole, and wherein the reflective mirror is fixedly connected to the second support frame.

2. The projector of claim 1, wherein the second support frame includes a second mounting plate, wherein the second mounting plate is pivotally connected to the second lens cover; and wherein the second mounting plate has a second mounting slot for mounting the reflective mirror, and wherein the reflective mirror is accommodated in the second mounting slot.

3. The projector of claim 1, wherein the second lens cover is rotatably connected to the projector body, wherein when the second lens cover is rotated to a predetermined position relative to the projector body, the second lens cover supports the projector body.

4. A projector comprising:

a projector body having a lens; and a light reflection assembly for adjusting a projection direction of the lens;

wherein the light reflection assembly includes a reflective mirror, wherein the reflective mirror is rotatably connected to the projector body, and wherein during rotation, a mirror surface of the reflective mirror always faces towards the lens, and wherein the light reflecting assembly further includes a base and a third support frame pivotally connected to the base, wherein the reflective mirror is fixedly connected to the third support frame, and wherein the base is detachably attached to the projector body.

5. The projector of claim 4, wherein the third support frame includes a third mounting plate, wherein the third mounting plate is pivotally connected to the base; and wherein the third mounting plate has a third mounting slot for mounting the reflective mirror, and wherein the reflective mirror is accommodated in the third mounting slot.

6. The projector of claim 4, wherein a housing of the projector body is magnetic, wherein the light reflecting assembly further includes a magnetic member having a magnetic property corresponding to that of the housing, and wherein the magnetic member and the housing cooperate to connect the base to the projector body.

\* \* \* \* \*